United States Patent [19]

Harris et al.

[11] Patent Number: 5,339,902

[45] Date of Patent: Aug. 23, 1994

[54] WELL CEMENTING USING PERMEABLE CEMENT

[75] Inventors: Kirk L. Harris, Aberdeen, United Kingdom; Robert B. Carpenter, Allen, Tex.; Ronald E. Himes, Duncan, Okla.; E. Dwyann Dalrymple, Duncan, Okla.; Jeffrey A. Dahl, Duncan, Okla.; Bruce D. Thomas, Duncan, Okla.

[73] Assignee: Halliburton Company, Duncan, Okla.

[21] Appl. No.: 42,368

[22] Filed: Apr. 2, 1993

[51] Int. Cl.⁵ ............................................. F21B 33/14
[52] U.S. Cl. .................... 166/293; 106/682; 166/292
[58] Field of Search ............ 166/268, 292, 293, 309; 106/682 X

[56] References Cited

U.S. PATENT DOCUMENTS

| | | | |
|---|---|---|---|
| 1,896,212 | 2/1933 | Woods | 166/276 |
| 2,187,895 | 1/1940 | Sanders | 166/276 |
| 2,193,775 | 3/1940 | Stratford | 166/278 |
| 2,193,807 | 3/1940 | Dieterich | 166/292 |
| 2,240,622 | 5/1941 | Lawson | 106/682 X |
| 2,288,556 | 6/1942 | Vollmer | 166/276 |
| 2,365,428 | 12/1944 | Muskat | 166/268 |
| 3,146,828 | 9/1964 | Mann . | |
| 3,219,109 | 11/1965 | Stein | 166/276 |
| 3,368,623 | 2/1968 | Carter et al. . | |
| 3,429,373 | 2/1969 | Harnsberger et al. | 166/276 |
| 3,633,287 | 5/1972 | Mizunuma et al. | 106/315 |
| 4,702,318 | 10/1987 | Chung et al. | 166/268 |
| 5,027,900 | 7/1991 | Wilson | 166/50 X |
| 5,058,676 | 10/1991 | Fitzpatrick et al. | 166/278 |
| 5,125,455 | 6/1992 | Harris et al. | 166/292 |
| 5,128,390 | 7/1992 | Murphey et al. | 523/130 |
| 5,133,409 | 7/1992 | Bour et al. | 166/293 |
| 5,188,176 | 2/1993 | Carpenter | 166/50 X |
| 5,211,234 | 5/1993 | Floyd | 166/276 |
| 5,213,161 | 5/1993 | King et al. | 166/293 |
| 5,251,697 | 10/1993 | Shuler | 166/268 |

OTHER PUBLICATIONS

Aldrich, C. H. and Mitchell, B. J., "Strength, Permeabilities, and Porosity of Oil Well Foam Cement," *Journal of Engineering for Industry*, 1975.

Harris, K., "New Lightweight Technology for the Primary cementing of Oil Field Casing in Cold Environments," Society of Petroleum Engineers, Inc. (SPE), Paper No. 22065, presented at the 1991 SPE Artic Technology Conference.

*Primary Examiner*—George A. Suchfield
*Attorney, Agent, or Firm*—Robert A. Kent; Thomas R. Weaver; C. Clark Dougherty, Jr.

[57] ABSTRACT

A method of cementing a well casing or liner in a well bore wherein an annulus exists around the exterior of the casing or liner. The method comprises the step of placing a foamed cement slurry composition in the annulus. A method of treating a well bore comprising the steps of: (a) filling an uncased portion of the well bore with a foamed cement slurry composition; (b) allowing the cement composition to harden; and (c) drilling a hole through the hardened cement composition along at least a portion of the uncased portion of the well bore.

12 Claims, No Drawings

WELL CEMENTING USING PERMEABLE CEMENT

FIELD OF THE INVENTION

The present invention relates to methods of cementing well casings in well bores. The present invention also relates to methods of cementing uncased well bores.

BACKGROUND OF THE INVENTION

When producing oil and/or gas from an unconsolidated subterranean formation, some type of particulate control procedure may be required in order to prevent sand grains and/or other formation fines from migrating into the well bore and being produced from the well. The production of such particulate materials can reduce the rate of hydrocarbon production from the well and can cause serious damage to well tubulars and to well surface equipment.

Those skilled in the art have commonly used gravel packs to control particulate migration in producing formations. A gravel pack will typically consist of a mass of sand and/or gravel which is placed around the exterior of a screening device, said screening device being positioned in an open hole or inside a well casing. Examples of typical screening devices include wire-wrapped screens and slotted liners. The screening device will typically have very narrow slots or very small holes formed therein. These holes or slots are large enough to permit the flow of formation fluid into the screening device but are too small to allow the gravel/sand constituents of the gravel pack to pass therethrough. In conjunction with the operation of the holes or slots formed in the screening device, the gravel/sand constituents of the gravel pack operate to trap, and thus prevent the further migration of, particulate materials which would otherwise be produced along with the formation fluid.

Unfortunately, the installation of gravel packs in underground formations can be quite costly. Additionally, special equipment is required for installing gravel packs.

Another technique used to control particulate migration in producing formations involves the use of chemical consolidation treatments. Chemical consolidation treatments can also be quite costly. Further, these treatments require the use of special chemicals and equipment.

Nonpermeable foamed cement compositions have been used heretofore in oil and gas wells for performing various primary cementing operations. Nonpermeable foamed cement compositions are formed by introducing nitrogen, air, or some other gas into a cement slurry. Compared to non-foamed cement compositions, nonpermeable foamed cement compositions typically have low densities and low fluid loss properties.

In performing a primary cementing operation using either a nonpermeable foamed cement composition or some other type of nonpermeable cement slurry composition, the cement composition is pumped down a casing disposed in a well bore such that, when the cement slurry reaches the bottom of the casing, the cement slurry flows up and into the annulus existing between the exterior of the well casing and the earthen wall of the well bore. Upon setting, the nonpermeable cement composition bonds to the casing and to the well bore such that (1) the casing is rigidly supported within the well bore and (2) fluid flow within the cemented portion of the annulus is prevented.

Due to their low densities, nonpermeable foamed cement compositions can be advantageously used in primary cementing operations where it is necessary to minimize hydrostatic pressure effects on weak formations and/or to lift primary cement columns over long annular intervals. Additionally, compared to non-foamed cement compositions, nonpermeable foamed cement compositions typically have high compressibilities. Due to their high compressibilities, nonpermeable foamed cements are resistant to the incursion of pressurized formation gases into and around the cement composition during the primary cementing operation (i.e., before the cement composition has set).

As is well known in the art, a high deviation well, e.g., a horizontally completed well, can be drilled when it is desirable to obtain a well bore which is not strictly vertical. As used herein and in the claims, the term "high deviation well" refers to any well having a well bore which is intentionally drilled such that one or more portions of the well bore are nonvertical. A high deviation well bore can be drilled, for example, when it is desirable to direct the well bore around, to, or through a given formation. The term "horizontally completed well," as used herein, refers to a well wherein the well bore has been drilled to include one or more substantially horizontal sections.

Subterranean formations, although typically very thin, can extend great distances horizontally. Thus, although the bore of a strictly vertical well would extend only a few feet through a typical thin formation, a horizontally completed well can include one or more horizontal well bore sections which extend several hundred or several thousand feet through the formation. By providing much greater contact between the well bore and the formation, the horizontally completed well can provide a higher production rate than would be provided by a strictly vertical well.

In one technique commonly used for completing high deviation wells, a casing is installed in only the substantially vertical initial portion of the well bore. Consequently, formation fluid flows freely into the uncased horizontal portion of the well and is then recovered through the vertical well casing. Unfortunately, however, the uncased horizontal portion of the well will typically be highly susceptible to cave-ins and sloughing, particularly when the formation through which the horizontal section of the well bore runs is a significantly unconsolidated formation. Additionally, the level of particulate migration occurring in the uncased horizontal portion of a horizontally completed well can be quite high. As discussed above, particulate migration can reduce the hydrocarbon production rate from the well and can cause serious damage to well tubulars and surface equipment.

A second technique commonly used for completing horizontal wells involves placing a length of slotted liner or casing in the horizontal portion of the well. The slotted liner or casing operates to prevent the horizontal portion of the well from collapsing. In order to prevent particulate migration into the slotted liner or casing, a gravel pack can be placed around the exterior of the liner or casing in the same manner as described hereinabove. However, as also discussed above, the installation of a gravel pack can be quite costly, particularly when the gravel pack must extend several hundred or several thousand feet along the horizontal portion of a horizontally completed well.

A third technique commonly used for completing horizontal wells involves placing and cementing a casing in both the vertical and horizontal portions of the well bore. Perforations or sliding sleeve valves must be placed along the horizontal portion of the casing in order to allow the casing to communicate with the producing formation. The formation is typically fractured through these casing perforations or valves. Unfortunately, however, this system typically does not provide adequate protection against the migration of formation particulates into the well casing. Additionally, the perforating operation itself may promote the deconsolidation of the formation. Further, in a highly deviated well, it is typically not desirable to place cement across the productive interval of a naturally fractured formation since the cement will block the horizontal flow of fluid from the natural fractures to the casing perforations or valves.

In view of the above comments, it is evident that a problem of longstanding existing in the completion of wells in subterranean formations having a substantial degree of unconsolidation resides in the need to reduce, if not prevent, the migration of formation particles from the formation to the production tubing and surface equipment without, at the same time, reducing the flow of desired fluids, e.g., oil and/or gas, from the formation. This problem is difficult enough when the borehole is substantially vertical, but it is even more difficult when the borehole is highly deviated or is, in fact, horizontal.

It is understood that producing formations cannot be blocked, such as by primary cementing, because cements ordinarily employed in primary cementing, have very low permeability, e.g. less than about 0.001 darcies, which would prevent the flow of desirable fluids from the formation to the production equipment. Accordingly, producing formations penetrated by a borehole are usually not cemented and migration of formation particulates from unconsolidated formations is reduced, or prevented, as above discussed, chemically, by employing a formation consolidation technique, or, mechanically, by employing a gravel packing technique. The above techniques have been used successfully in completing a substantially vertical borehole wherein the portion of the borehole which does not penetrate a producing formation can be cemented to thereby support the casing and isolate and protect producing formations, while unconsolidated producing formations penetrated by the same borehole can be chemically or mechanically treated, as mentioned above, to reduce or prevent fines migration whole not blocking the flow of desirable fluids.

In contrast with a vertical borehole, a borehole, or a very long portion of one, which lies entirely within a producing formation, such as a horizonal borehole, requires the use of a completion technique which will function to maintain the structural integrity of the borehole itself, i.e., prevent collapse, which will not prevent the flow of desirable fluids from the formation to the production tubulars. Known cements would maintain structural integrity of the borehole, but would also prevent flow of desired fluids. Chemical and mechanical treatments, as above described, would not prevent the flow of desired fluids, but are very difficult to install in highly deviated boreholes and the ability of such treatments to provide adequate structural integrity has not been established.

Accordingly, the art requires a method which will supply the structural integrity provided by primary cementing; which will control, where required, the movement of formation fines; and which will not prevent the flow of desired fluids from the formation to the production tubulars. This invention provides such a method which features the use of a cement having a permeability low enough to prevent migration of formation particulates but high enough to permit the flow of desired fluids through the hardened cement to production tubulars. The cement develops sufficiently high compressive strength to support and protect formations but is also of sufficiently low density to permit use in weak formations. This cement and the method disclosed is, accordingly, useful in vertical as well as in highly deviated and horizontal boreholes.

SUMMARY OF THE INVENTION

The present invention provides a method of cementing a conduit (e.g., a casing or liner) in a well bore wherein an annulus exists around the exterior of the conduit. The method comprises the step of placing a foamed permeable cement composition in the annulus.

The present invention also provides a method of cementing a conduit (e.g., a casing or liner) in a high deviation well bore wherein an annulus exists around the exterior of the conduit. This method comprises the step of placing a foamed permeable cement composition in a nonvertical portion of the annulus.

The present invention further provides a method of treating a well bore comprising the steps of: (a) filling an uncased portion of the well bore with a foamed permeable cement composition; (b) allowing the permeable cement composition to harden; and (c) drilling a hole through the permeable cement composition along at least a portion of the uncased portion of the well bore.

The inventive method provides effective and less costly means of: (1) supporting casings in unconsolidated formations and/or nonvertical well bores; (2) preventing the migration of particulate materials into well casings from unconsolidated formations and/or from nonvertical well bores; and (3) preventing well bore collapse in unconsolidated formations and/or nonvertical well bores. Additionally, the inventive method facilitates fluid production from unconsolidated formations and/or nonvertical well bores. Further, the inventive method eliminates the need for costly gravel packs and chemical consolidation treatments and, in some cases, eliminates the need for performing perforating operations.

Further objects, features, and advantages of the present invention will be apparent to those skilled in the art upon reading the following description of the preferred embodiments.

DESCRIPTION OF THE PREFERRED EMBODIMENTS

The inventive method preferably utilizes a foamed cement composition which, when set, is sufficiently permeable to allow oil, gas, and/or other formation fluids to flow therethrough but will not allow the migration of substantial quantities of formation particulates. A cement composition having a permeability of about 0.3 darcies will typically be as conductive to flow as most producing subterranean formations. Consequently, when set, the cement composition used in the inventive method will preferably have a permeability of at least about 0.3 darcies. More preferably, the cement composition will have a permeability in the range of from about 0.3 to about 50 darcies. Foamed cement compositions having permeabilities in the range of from about 0.3 to about 30 darcies are particularly well-suited for use in the present invention. Cement compositions having permeabilities in the range of from about 0.3 to about 30 darcies will be conductive to formation fluid flow but will prevent the migration of formation particulates.

The foamed cement composition used in the method of this invention is comprised of hydraulic cement, an amount of water sufficient to form a pumpable slurry, and a gas such as nitrogen or air. The foamed cement composition will preferably contain in the range of from about 38% to about 90% water by weight of hydraulic cement.

As defined in Hawley's *Condensed Chemical Dictionary*, 11th Edition, Van Nostrand, Reinhold Company, 1987, a hydraulic cement is any mixture of fine-grained lime, alumina, and silica that will set to a hard product by admixture of water which combines chemically with the cement ingredients to form a hydrate. Examples of hydraulic cements preferred for use in the present invention include Portland cement and calcium aluminate cement. Class H and Class C Portland cement are particularly well-suited for use in the present invention.

The gas component of the foamed cement composition will preferably be added in an amount sufficient to provide a foamed cement composition density in the range of from about 4.5 lb/gal to about 10 lb/gal. Stable foamed cement compositions having densities of less than 4.5 lb/gal are generally difficult to form. Foamed cement compositions having densities substantially above 10 lb/gal, on the other hand, are generally nonpermeable when hardened.

The gas component preferred for use in the foamed cement composition is air. Air provides a larger bubble structure than does nitrogen. Thus, all things being equal, foamed cement compositions prepared using air are more permeable than foamed cement compositions prepared using nitrogen.

As indicated above, the gas component of the foamed cement composition will most preferably be added to the foamed cement composition in an amount sufficient to provide a hardened composition permeability in the range of from about 0.3 to about 30 darcies. Permeabilities within this range will typically be achieved when the gas component of the foamed cement composition is present in an amount in the range of from about 30% to about 70% by volume based on the total volume of the foamed cement composition.

The foamed cement composition used in the inventive method will also preferably include at least one foaming agent. The foaming agent will preferably operate to facilitate the foam forming process and to stabilize the foamed cement composition. Generally any foaming agent used for producing foamed cement compositions can be used in the inventive method. The foaming agent presently preferred for use in the permeable foamed cement composition is a commercially available material composed of ammonium ether sulfate, ethylene glycol monobutyl ether and water. When used, the foaming agent will preferably be present in the foamed cement composition in an amount in the range of from about 0.5% to about 5% by volume based on the total volume of the hydraulic cement and the water components of the foamed cement composition.

The foamed cement composition can further include at least one foam stabilizer. The foam stabilizer presently preferred for use in the permeable foamed cement composition is 1-propanaminium, 3-amino-N-(carboxymethyl)-N-N-dimethyl-N-Coco alkyl. The foam stabilizer is preferably present in the foamed cement composition in an amount in the range of from about 0.25% to about 3% by volume based on the total volume of the hydraulic cement and the water components of the foamed cement composition.

The foamed cement composition can also include generally any additive which is used in the art for the production of foamed cement compositions. Examples of such additives include: fluid loss additives, lost circulation additives, expansion additives, hardening accelerators, hardening retarders, weighting agents, and strength enhancing fibers (e.g., glass fiber, carbon fiber, cotton fiber, polyester fiber, and the like).

The foamed cement composition can generally be prepared using any technique which is commonly used in the art for preparing foamed cement compositions. One particularly desirable method of forming the foamed cement composition includes the steps of: (1) dry mixing the cement component of the composition with any dry additives which are to be included in the composition; (2) mixing the resulting dry blend with the water and any liquid additive components of the foamed cement composition to form a slurry; (3) pumping the slurry into the well bore of the well being treated; and then (4) injecting the gas component of the foamed cement composition into the composition as it flows into the well bore. As the resulting composition flows into the well bore and down the well tubing, a stable foam is formed. If desired, any liquid additives used in the foamed cement composition could alternatively be injected into the cement composition as it flows into the well bore.

In one particularly preferred embodiment of the inventive method, the foamed cement slurry composition is pumped down a tubing string positioned within a slotted or perforated well casing, liner, or similar conduit which extends into the well. The annulus between the tubing string and the slotted or perforated conduit is temporarily blocked using packers positioned above and below the slotted or perforated portion of the conduit. With these packers in place, the cement composition flowing out of the end of the tubing string is forced to flow upward into the annulus existing on the outside of the conduit. When the foamed cement composition is in place across the slotted or perforated section of the conduit, the pumping operation is discontinued and the cement composition is allowed to harden. The hardened cement composition forms a hard, permeable, cement sheath around the exterior of the conduit.

This embodiment of the inventive method is particularly useful for completing portions of a well which are nonvertical and/or extend through unconsolidated producing formations.

The permeable cement sheath formed around the exterior of the well casing or liner in accordance with this embodiment of the present invention can be used to direct well stimulation treatments to targeted formation intervals by injecting diverting agents or other materials into those portions of the cement sheath which extend through nontargeted portions of the formation. Alternatively, these materials can be used to seal or isolate sections of the wellbore to prevent the production of unwanted fluids, such as brine water and the like. These diverting agents or other materials operate to substantially reduce the permeability of the portions of the cement sheath into which they are injected so that the well stimulation fluids are directed to the targeted portions of the formation or production of undesired formation fluid is substantially reduced.

In another particularly preferred embodiment of the inventive method, the foamed cement composition is pumped into an uncased portion of a well bore. After the uncased portion of the well bore is filled with the cement slurry composition, the composition is allowed to harden. Subsequently, a hole is drilled through the hardened cement material along at least a portion of the length of the uncased well bore section. The resulting permeable cement structure allows the free flow of oil, gas, and/or other formation fluid into the well bore but prevents the substantial migration of formation particulates into the well bore. This second embodiment of the inventive method is especially well-suited for treating uncased well bore sections which extend through unconsolidated producing formations.

In each of the embodiments of the inventive method discussed above, acid treatments (e.g., hydrochloric and/or hydrofluoric acid solution treatments) or other matrix treatments can be used to increase the permeability of the hardened cement material. Such treatments will typically operate to dissolve one or more components of the hardened cement composition and thereby increase the pore size and permeability of the hardened composition. Consequently, in conjunction with these treatments, it is preferred that the cement composition include at least one additive which will readily dissolve when treated. The preferred additive used in the cement composition for accomplishing this purpose is calcium carbonate. Calcium carbonate is essentially an inert additive when included in the foamed cement composition. However, the calcium carbonate additive will readily dissolve when the hardened cement composition is treated with acid.

The following example is provided in order to illustrate the present invention.

EXAMPLE 650 grams of Class C Portland cement, 364 grams of water, 4.3 milliliters of the preferred foaming agent and 2.2 milliliters of foaming surfactant, 1-propanaminium, 3-amino-N-(carboxymethyl)-N-N-dimethyl-N-Coco alkyl, were mixed together. The mixture was then added to a previously tared Waring blender jar to bring the total weight of the contents of the jar to 710 grams. Next, the mixture contained in the jar was foamed with air by capping the jar and blending at maximum speed for 10 seconds. The resulting foamed cement slurry composition had a density of 5 lb/gal. Upon hardening, the foamed cement composition had a permeability of 27.2 darcies. Additionally, the hardened cement composition exhibited compressive strengths of 50 psi after 24 hours, 120 psi after 48 hours, 130 psi after 72 hours, and 165 psi after 96 hours. Thus, the hardened cement composition would be conductive to formation fluid flow but would operate to prevent the migration of formation particulates. Additionally, the hardened cement composition possesses sufficient strength to prevent well bore collapse and/or to rigidly support a well casing in a well bore.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of cementing a conduit in a high deviation well bore having an annulus around the exterior of said conduit, said method comprising the steps of placing a foamed cement slurry composition in said annulus and permitting said composition to harden in said annulus;
    wherein, when hardened, said cement composition has a permeability of at least 0.3 darcies.

2. The method of claim 1 wherein said foamed cement slurry comprises hydraulic cement, water, and a gas; wherein said water is present in said slurry in an amount in the range of from about 38% to about 90% water by weight of said hydraulic cement, and said gas is present in said slurry in an amount in the range of from about 30% to about 70% by volume based on the total volume of said foamed cement slurry composition.

3. The method of claim 2 wherein said foamed cement slurry composition further comprises a foaming agent in an amount in the range of from about 0.5% to about 5% by volume based on the total volume of said hydraulic cement and said water.

4. The method of claim 3 wherein said foamed cement slurry composition further comprises a foam stabilizer in an amount in the range of from about 0.25% to about 3% by volume based on the total volume of said hydraulic cement and said water.

5. The method of claim 2 wherein said foamed cement slurry composition has a density in the range of from about 4.5 to about 10 lb/gal.

6. The method of claim 2 wherein (a) said conduit has fluid flow means provided therein for allowing fluid flow through the wall of said conduit, (b) said foamed cement slurry composition further comprises calcium carbonate, and (c) after said foamed cement composition has hardened, said composition is acid treated such that at least a portion of said calcium carbonate dissolves and the permeability of said composition is increased.

7. The method of claim 1 wherein said well bore is a horizontally completed well bore wherein said cement composition is placed in a substantially horizontal portion of said annulus.

8. The method of claim 1 wherein said conduit has fluid flow means provided therein for allowing fluid flow through the wall of said conduit and wherein said method further comprises the step, after said cement composition has hardened, of injecting a diverting agent into said cement composition.

9. A method of cementing a conduit in a high deviation well bore wherein an annulus exists around the exterior of said conduit, said method comprising the steps of placing a foamed cement slurry composition in a non-vertical portion of said annulus and permitting said composition to harden wherein, when hardened, said cement slurry composition has a permeability of at least 0.3 darcies.

10. The method of claim 9 wherein said foamed cement slurry composition comprises hydraulic cement, water, and a gas, wherein said water is present in said slurry in an amount in the range of from about 38% to about 90% water by weight of said hydraulic cement, and said gas is present in said slurry in an amount in the range of from about 30% to about 70% by volume based on the total volume of said foamed cement slurry composition.

11. The method of claim 10 wherein said non-vertical portion of said annulus is substantially horizontal.

12. A method of treating a targeted portion of a subterranean formation, said subterranean formation having a well bore extending thereinto, said well bore having a conduit placed therein such that an annulus exists around the exterior of said conduit, said conduit and said annulus extending into both said targeted portion of said formation and a nontargeted portion of said formation, and said conduit having fluid flow means provided therein for allowing fluid flow through the wall of said conduit, wherein said method comprises the steps of:

(a) placing a foamed cement slurry composition in the portions of said annulus extending into said targeted and said nontargeted portions of said formation, said cement composition having a permeability, when hardened, of at least 0.3 darcies;

(b) permitting said cement composition to harden;

(c) injecting a diverting agent into the portion of said hardened cement composition extending into said nontargeted portion of said formation such that the permeability of the portion of said hardened cement composition extending into said nontargeted portion of said formation is at least partially reduced; and (d) injecting a formation treating fluid through the portion of said hardened cement composition extending into said targeted portion of said formation.

* * * * *